United States Patent [19]

Sumi

[11] 4,179,365
[45] Dec. 18, 1979

[54] PROCESS FOR TREATING WASTE WATER

[75] Inventor: Etsuo Sumi, Fujieda, Japan

[73] Assignee: Sumitomo Durez Company, Ltd., Tokyo, Japan

[21] Appl. No.: 952,911

[22] Filed: Oct. 19, 1978

[30] Foreign Application Priority Data

Oct. 28, 1977 [JP] Japan ................................. 52-128647

[51] Int. Cl.$^2$ ........................... C02C 1/06; C02C 5/10; B01D 11/04
[52] U.S. Cl. .......................................... 210/8; 210/10; 210/11; 210/15; 210/29; 210/73 R; 568/749; 210/22 R
[58] Field of Search ................... 210/8, 10, 11, 15, 21, 210/22, 73 R, 83, 29, 36, 40, 196, 201, 259, 265, 266, 319; 195/2; 568/749, 757, 758; 422/256

[56] References Cited

U.S. PATENT DOCUMENTS

| | | | |
|---|---|---|---|
| 2,807,654 | 9/1957 | Grimmett et al. | 210/21 |
| 2,927,075 | 3/1960 | Brown | 210/21 |
| 3,660,278 | 5/1972 | Mimura et al. | 210/11 |
| 3,779,866 | 12/1973 | Azarowicz | 195/2 |
| 3,870,599 | 3/1975 | Azarowicz | 195/2 |
| 3,871,956 | 3/1975 | Azarowicz | 210/11 |
| 3,979,283 | 9/1976 | Prudom | 210/11 |
| 4,026,791 | 5/1977 | Wallace | 210/21 |

FOREIGN PATENT DOCUMENTS

| | | | |
|---|---|---|---|
| 2311759 | 12/1976 | France | 210/11 |
| 51-16756 | 2/1976 | Japan | 210/21 |
| 51-78062 | 7/1976 | Japan | 210/11 |

*Primary Examiner*—Charles N. Hart
*Assistant Examiner*—David Sadowski
*Attorney, Agent, or Firm*—Peter F. Casella; James F. Mudd

[57] ABSTRACT

A process is provided for treating waste liquor or waste water containing free phenols in excess of 10,000 ppm, harmful to aerobic bacteria present in the activated sludge for general purpose, comprising the steps of (1) reducing the phenol content to 100 ppm or less by means of solvent extraction or adsorption, (2) conditioning the waste water obtained in step (1) in a large conditioning tank to adjust the pH, temperature and BOD, (3) treating the waste water obtained in step (2) in an aerating tank by means of activated sludge for general purpose containing aerobic bacteria, and (4) separating the treated water from the sludge in a sedimentation tank. Preferably above 10 to 50 weight percent of the treated water is recycled to the conditioning step (2).

4 Claims, No Drawings

PROCESS FOR TREATING WASTE WATER

BACKGROUND OF THE INVENTION

The recovery of phenols from industrial waste liquor by suitable processes, and the treatment thereof with activated sludge containing certain microorganisms are already known.

Although in the past the waste liquor could be discarded after either one of the above-mentioned treatments, stricter regulations on waste water quality in recent years require further reduction in the content of substances in the treated water.

The waste water treatment with activated sludge has long been known and is already common practice in the industries. In certain cases, however, there is required a cultivation of particular microorganisms in large quantity since the microorganisms present in the activated sludge for general purposes are damaged by certain waste liquors. For example, free phenols which are extremely harmful to the active microorganisms present in the sludge are frequently found in the waste liquors from facilities for coke or coal gas production where the processes provide free phenols as by-products, facilities for phenol synthesis, facilities for producing phenolic resins and derivatives thereof, facilities for producing intermediates for dyes, agricultural chemicals, rubber modifiers, detergents and other industrial products, facilities for producing aromatic anti-oxidants and other additives, plywood manufacturing facilities and other facilities utilizing these materials in large quantities.

Certain phenols, for example cresol or phenol, are widely utilized for sterilization at a certain concentration, particularly by doctors. As is understandable from this fact, the free phenols in waste liquor from the aforementioned facilities, if there be a sudden surge in concentration for some reason and brought into direct contact with the activated sludge for general purpose, it will poison and kill the microorganisms present therein. Even if they are not killed immediately, the microorganisms maintained in prolonged contact with free phenols are gradually deprived of their activity and will die eventually.

Also waste liquors containing free phenols are generally acidic, or extremely alkaline if alkaline substances are employed for example as catalyst. Such waste liquors are not suitable for direct treatment with activated sludge for general purpose as the microorganisms present therein are known to be most active when maintained in contact with a waste liquor of neutral or weakly basic character. Although preconditioning in possible in such case, such preconditioning requires dilution of the waste liquor with a large amount of water, increasing the amount to be treated and resulting in a larger facility and a higher treating cost for industrial use. Also such preconditioning, involving microorganisms, is delicate and difficult to perform.

In order to treat such waste liquor containing free phenols by means of activated sludge there have been reported various attempts, such as:

(1) Decomposition by means of special domesticated microorganisms such as Trichosporon sp. red yeast (J. Nei, Hakko Kagaku Zasshi, 49 (8) 655 (1971) or Candida tropicalis (K. Ichikawa, Kogaku Kojo 17 (4), 77 (1973));

(2) Prolonged domestication of microorganisms in case of activated sludge for general use (H. Ono, Hakko Kogaku Zasshi 49 (4), 367 (1971));

(3) Resinification of free phenols by means of an alkaline substance as a pretreatment of waste liquor, eventually followed by addition of alkaline substance and centrifuging (S. Fukuoka et al., Hakko Kogaku Zasshi, 45 (2), 159 (1967)) etc.

These methods, though valuable as research methods, are not necessarily suitable for industrial use. More specifically, method (1) requires domestication of a large amount of microorganisms of of particular species with considerably cumbersome procedure, while method (2) cannot be used for immediate need, and method (3) is applicable only for particular phenols. Also the installation of a centrifuging facility and handling of the centrifuged material will require, in industrial scale, far greater efforts than in laboratory scale.

SUMMARY OF THE INVENTION

The present invention relates to a process for treating waste liquor or waste water (hereinafter referred to as waste liquor or waste aqueous stream) containing phenols by means of activated sludge, and more particularly to a process for treating waste liquor characterized by steps of removing excess free phenols essentially harmful to aerobic bacteria and fungi (hereinafter collectively called microorganisms) present in the activated sludge for general purpose by means of a phenol recovery plant, then treating the resulting effluent in a large conditioning tank, and bringing the resulting liquor in contact with activated sludge for general purpose, preferably under a low BOD load thereby to obtain a clean treated water through the function of microorganisms, and further characterized by a step of recycling said treated water to said large conditioning tank thereby achieving preliminary treatment of the waste liquor in the large conditioning tank, an approach toward a closed system treatment of waste liquor.

DISCLOSURE OF EMBODIMENTS

We have found that, in the treatment of waste liquor with activated sludge, the preliminary removal of phenols, by means of a phenol recovery plant, from waste liquor rich in free phenols coming from the above-mentioned facilities is most effective for protecting the microorganism treatment. Such a process not only allows us to recover the phenols but also to avoid preparation of particular microorganisms for the waste liquor treatment and to avoid damages to the microorganisms by direct contact to the phenols. The phenol recovery plant used herein may be based on extraction of free phenols with suitable organic solvents such as aromatic or aliphatic hydrocarbons, ethers, ketones or amines, or removal of free phenols by adsorption with active charcoal or other adsorbent material, but use of the former process is preferred as it will allow easy recovery of phenols through extraction and distillation of the solvent, thus economizing in raw material at low cost.

The extraction process is capable of reducing the phenol content of waste liquor from 10,000 ppm or higher to 100 ppm or lower. (The content in ppm mentioned herein is determined according to JIS K-0102.)

Now treatment of the waste water of which phenol content has been reduced to 100 ppm or lower by the phenol recovery plant (such waste water will be called B-step waste water) will be explained. The pH value of the B-step waste water is not necessarily suitable for the microorganisms present in the activated sludge for general purpose. For this reason the B-step waste water is introduced into a large conditioning tank and is supplied with nutrients, is diluted, undergoes adjustment of pH and temperature and a pre-contact treatment with recycled treated water from the aerating tank.

The large conditioning tank is equipped with conduits for supplying nutrients, heating or cooling water, acid or alkali and recycled treated water from the aerating tank, and is further provided with sensing devices necessary for the adjustment of the B-step waste water, whereby the pH value and the temperature of waste water are respectively adjusted to 7–8.5 and 10°–30° C.

The large conditioning tank has a capacity from 0.3 to 1.0 times, preferably 0.4 to 0.7 times, of the daily volume of waste liquor treated in the aerating tank. A capacity lower than these may result in an overflow of the conditioning tank while a capacity higher than these will result in a higher construction cost and thus in a higher treating cost. The large conditioning tank is internally divided into two to five sections, of which one is used for receiving the B-step waste water while the remainder is used for other adjustments. A number of sections exceeding five is generally disadvantageous because of higher construction cost and complicated operation.

The conditioning tank may additionally receive other miscellaneous waste water such as waste water such as from sanitary septic tanks and rain water.

The large conditioning tank may also be provided with a heat exchange pipe or an agitator in order to maintain the water temperature within the above-mentioned range. The conditioning tank is provided with a large capacity in order to prevent fluctuation of load, to accomodate the increase resulting from recycle of water treated in the aerating tank and to reduce the temperature fluctuation when conditioning the B-step waste water. The waste water thus conditioned (hereinafter referred to as C-step waste water) is supplied to the aerating tank.

According to the present invention the C-step waste water is supplied to the aerating tank at a temperature of 10°–30° C. and a BOD sludge load much lower than in the case of ordinary waste water treatment with activated sludge, thus creating an optimum condition for the activity of microorganisms present in the activated sludge for general use.

In the aerating tank the C-step waste water is agitated and aerated while maintaining sufficient contact with the activated sludge for general use. The aeration is preferably conducted with an agitation causing rotational flow of the sludge so as to maintain the dissolved oxygen content in the aerating tank at 0.1 to 1 ppm, in order to prevent disintegration of the activated sludge by excessive air and thus to prevent increase of suspended matter in the treated water.

The treated water transferred from the aerating tank to the sedimentation tank is subjected to sedimentation of sludge, and the water thus treated (called final water) is discharged, preferably by overflow from the brim of the tank. Though the final water may be discarded to the outside, it is preferable in the present invention to recycle the final water, which may contain a certain amount of microorganisms, to the large conditioning tank in a proportion of 10–50% with respect to the discarded amount, whereby the B-step waste water is brought into preliminary contact with said microorganisms to reduce the sludge load in the aerating tank and to achieve an improvement toward a closed system of the waste water treatment. The recycled amount of final water is preferably within a range from 10 to 50% with respect to the discarded amount as explained in the foregoing, but said amount can naturally be increased further in case the waste water treatment is conducted in a stationary condition thereby achieving a further advanced closed system treatment.

The presence of highly toxic aldehydes in the industrial waste liquors for example from phenolic resin manufacturing facilities has been a problem, but it has been found that the most toxic formaldehyde, even when present as high as several hundred ppm's, could be decomposed by the domestication of activated sludge for general purpose (H. Ono, Hakko Kogaku Zasshi 49 (4), 367 (1971)).

Also it has been found that the content of aldehydes can be significantly reduced by the recycling of final water from the sedimentation tank to the large conditioning tank according to the present invention. Though this phenomenon requires further elucidation, the present inventor infers that the microorganisms remaining in the final water are effectively brought into contact with the aldehydes to convert the same into other substances.

Now in the following there will be shown a non-limitative example of the present invention.

EXAMPLE

A waste liquor A, containing 50,000 ppm of phenols resulting from a phenolic resin manufacturing process and having a composition shown in Table 1 at column (1), was adjusted to pH 3.5 with oxalic acid and was treated with a phenol recovery plant constructed by Sumitomo Chemical Engineering Co., Ltd. with a daily treating capacity of 60 m$^3$ utilizing iso-propyl ether as extracting solvent and waste water B with a composition shown in Table 1 at column (2) was obtained. The waste water B of 25 m$^3$/day was conditioned, in a large 4-sectional conditioning tank of a capacity of 2,500 m$^3$, to waste water C of 2,000 m$^3$/day with a composition shown in Table 1 at column (3). Waste water C was supplied to the aerating tank and subjected to aeration by agitation with activated sludge with a low BOD load such as 0.08 kg. BOD/kg ss.d, and thereafter supplied to the sedimentation tank. (kg. ss.d refers to kg of suspended solids per day.) The final water (2,000 m$^3$/day) overflowing from said sedimentation tank had a composition shown in Table 1 at column (4) which was evidently suitable for discharge.

10% of said final water (200 m$^3$/day) was recycled to the large conditioning tank through a path branched from the discharging pipe. The values shown in Table 1 at columns (1) to (4) were measured under stationary operation according to the present invention, and the fact that the concentration of formaldehyde in waste water C from the conditioning tank was significantly reduced as shown in column (3) seems ascribable to the preliminary treatment of waste water B by the microorganisms present in the final water recycled to the conditioning tank.

The phenol recovery plant constructed by Sumitomo Chemical Engineering Co., Ltd. and the process used therein were based on the invention disclosures in Japanese patent application No. 5247/1969.

TABLE 1

| Waste Liquor /water | (1) Waste liquor A | (2) Waste water B | (3) Waste water C | (4) Final water |
|---|---|---|---|---|
| Phenols | 50,000 ppm | 80 ppm | 1 ppm | 0.07 ppm |
| Formaldehyde | 10,000 ppm | 9,500 ppm | 20 ppm | 0.3 ppm |
| Methanol | 30,000 ppm | 28,000 ppm | 100 ppm | not measurable |
| COD (Cr) | 220,000 ppm | 60,000 ppm | 750 ppm | |
| COD (Mn) | — | — | — | 7.2 ppm |
| BOD | 160,000 ppm | 40,000 ppm | 500 ppm | 4.8 ppm |
| pH | 3.5 (adjusted from 6) | 4.0 | 6.8 | 7.0 |
| Temperature | 23° C. | 62° C. | 28° C. | 26° C. |
| Note | *1 | *2 | *3 | |

Note
*1 pH adjusted to 3.5
*2 Phenol content significantly reduced. The recovered phenols were reusable.
*3 Formaldehyde content was reduced by preliminary content with microorganisms present in 10% of treated water recycled to the large conditioning tank.

The measurement were conducted according to JIS K-0102.

We claim:

1. A process for treating a waste aqueous stream containing greater than 10,000 ppm of free phenols which comprises the steps of:

(1) subjecting said waste stream to a solvent extraction process or an adsorption process to reduce the phenol content of the waste stream to less than 100 ppm, (2) treating the waste aqueous stream resulting from step (1) in a conditioning zone with nutrients and adjusting the concentration, pH and temperature of said waste aqueous stream to be within a pH range of about 6.4 to 7.6, a temperature range of about 15° to 35° C., and BOD range of about 350 to 800 ppm, (3) agitating the aqueous stream from step (2) in an aerating zone in contact with activated sludge containing aerobic bacteria, and (4) settling the activated sludge from the aqueous stream from step (3) to provide a purified water stream.

2. The process of claim 1 wherein about 10 to about 50 weight percent of the purified water stream from step (4) is recycled to step (2).

3. The process of claim 1 wherein the conditioning zone of step (2) has a capacity equal to about 0.3 to one times the amount of aqueous stream treated daily in the aerating zone.

4. The process of claim 1 wherein the treatment of the aqueous stream in step (3) is conducted with a BOD load of activated sludge of about 0.05 to 0.1 Kg BOD/Kg ss.d.